(12) United States Patent
Inoue et al.

(10) Patent No.: US 6,537,721 B2
(45) Date of Patent: Mar. 25, 2003

(54) OPTICAL RECORDING MEDIUM AND METHOD FOR ITS INITIALIZATION

(75) Inventors: Hiroyasu Inoue, Tokyo (JP); Makoto Takahashi, Tokyo (JP); Hajime Utsunomiya, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/503,474

(22) Filed: Feb. 14, 2000

(65) Prior Publication Data

US 2003/0008235 A1 Jan. 9, 2003

(30) Foreign Application Priority Data

Feb. 15, 1999 (JP) ............................. 11-035818

(51) Int. Cl.[7] ............................................... G11B 7/24
(52) U.S. Cl. .................. 430/269; 430/270.13; 430/945; 428/64.1; 428/64.4; 369/275.2; 369/275.5
(58) Field of Search ..................... 430/270.13, 945, 430/269; 428/64.1, 64.4; 369/275.2, 275.5

(56) References Cited

U.S. PATENT DOCUMENTS

| | | | |
|---|---|---|---|
| 5,362,538 A | * 11/1994 | Ohbayashi et al. | 430/270.13 |
| 5,424,106 A | * 6/1995 | Yamada et al. | 430/270.13 |
| 5,523,140 A | 6/1996 | Tominaga et al. | 428/64.1 |
| 5,637,372 A | * 6/1997 | Tominaga et al. | 430/270.13 |
| 5,863,702 A | * 1/1999 | Ohbayashi et al. | 430/270.13 |
| 5,876,822 A | * 3/1999 | Zhou et al. | 428/64.1 |
| 5,906,908 A | * 5/1999 | Ohkubo et al. | 430/270.13 |
| 6,004,646 A | * 12/1999 | Ohno et al. | 430/270.13 |
| 6,108,295 A | * 8/2000 | Ohno et al. | 430/270.13 |
| 6,129,968 A | * 10/2000 | Ogawa | 430/270.13 |
| 6,195,326 B1 | * 2/2001 | Yoshinari et al. | 430/270.13 |

FOREIGN PATENT DOCUMENTS

| | | |
|---|---|---|
| EP | 0 677 840 | 10/1995 |
| JP | 62-271238 | 11/1987 |
| JP | 64-86339 | 3/1989 |
| JP | 2-3131 | 1/1990 |
| JP | 2-5246 | 1/1990 |
| JP | 2-98847 | 4/1990 |
| JP | 2-201734 | 8/1990 |
| JP | 3-76027 | 4/1991 |
| JP | 4-366424 | 12/1992 |
| JP | 10-320837 | 12/1998 |
| JP | 11-3522 | 1/1999 |

* cited by examiner

Primary Examiner—Martin Angebrannd
(74) Attorney, Agent, or Firm—Oblon, Spivak, McClelland, Maier & Neustadt, P.C.

(57) ABSTRACT

A phase change optical recording medium is provided wherein the power of the laser beam per unit area required in the initialization is reduced. The optical recording medium has a phase change recording layer satisfying the relations:

$$A_I \leq 8.0\%,$$

and $$C_I/A_I \geq 3.0$$

when the medium is initialized with a light beam having a wavelength $\lambda_I$, and said recording layer exhibits a reflectivity $A_I$ in amorphous region and a reflectivity $C_I$ in crystalline region at said wavelength $\lambda_I$.

5 Claims, 2 Drawing Sheets

WRITING/READING LIGHT BEAM

WRITING/READING LIGHT BEAM

OPTICAL RECORDING MEDIUM AND METHOD FOR ITS INITIALIZATION

BACKGROUND OF THE INVENTION

1. Field of the Invention

This invention relates to a phase change optical recording medium and a method for its initialization (crystallization of its recording layer).

2. Prior Art

Highlight is recently focused on optical recording media capable of recording information at a high density and erasing the recorded information for overwriting. One typical overwritable optical recording medium is phase change optical recording medium wherein a laser beam is directed to the recording layer to change its crystalline state whereupon a change in reflectivity by the crystallographic change is detected for reading of the information. The phase change optical recording media are of great interest since the medium can be overwritten by modulating the intensity of a single laser beam and the optical system of the drive unit is simple as compared to magnetooptical recording media.

Most optical recording media of phase change type used chalcogenide systems such as Ge—Te system and Ge—Sb—Te system which provide a substantial difference in reflectivity between crystalline and amorphous states and have a relatively stable amorphous state. It was also recently proposed to use new compounds known as chalcopyrites. Chalcopyrite compounds have been investigated as compound semiconductor materials and have been applied to solar batteries and the like. The chalcopyrite compounds are composed of Ib-IIIb-VIb$_2$ or IIb-IVb-Vb$_2$ as expressed in terms of the Groups of the Periodic Table and have two stacked diamond structures. The structure of chalcopyrite compounds can be readily determined by X-ray structural analysis and their basic characteristics are described, for example, in Physics, Vol. 8, No. 8 (1987), pp. 441 and Denki Kagaku (Electrochemistry), Vol. 56, No. 4 (1988), pp. 228. Among the chalcopyrite compounds, AgInTe$_2$ is known to be applicable as a recording material by diluting it with Sb or Bi. The resulting optical recording media are generally operated at a linear velocity of about 7 m/s. See Japanese Patent Application Kokai Nos. (JP-A) 240590/1991, 99884/1991, 82593/1991, 73384/1991, and 151286/1992. In addition to the optical recording media of phase change type wherein chalcopyrite compounds are used, optical recording media of phase change type wherein AgSbTe$_2$ phase is formed with the crystallization of the recording layer is disclosed in JP-A 267192/1992, 232779/1992, and 166268/1994.

When information is recorded on the optical recording medium of phase change type, the entire recording layer is first brought into crystalline state, and then, a laser beam of high power (recording power) is applied so that the recording layer is heated to a temperature higher than the melting point. In the region where the recording power is applied, the recording layer is melted and thereafter quenched to form an amorphous record mark. When the record mark is erased, a laser beam of relatively low power (erasing power) is applied so that the recording layer is heated to a temperature higher than the crystallization temperature and lower than the melting temperature. The record mark to which the laser beam of erasing power is applied is heated to a temperature higher than the crystallization temperature and then allowed to slowly cool to recover the crystalline state. Accordingly, in the optical recording media of the phase change type, the medium can be overwritten by modulating the intensity of a single light beam.

In the case of the phase change type optical recording media, recording layers are formed using vacuum deposition equipment and the as-deposited recording layers remain amorphous with low reflectivity. The recording layers must be crystallized by an operation generally known as initialization before the recording media can be utilized as rewritable media.

Initialization is carried out in various ways, for example, after a recording layer is formed on a substrate, by heating the substrate to the crystallization temperature of the recording layer for crystallization as disclosed in JP-A 3131/1990; illuminating a laser beam to the recording layer for crystallization, which method is called solid phase initialization, as disclosed in JP-A 366424/1992, 201734/1990 and 76027/1991; and high-frequency induction heating the medium. JP-A 98847/1990 proposes to heat a substrate during formation of a recording layer to thereby crystallize the recording layer. JP-A 5246/1990 discloses a method involving the steps of forming a first dielectric layer, forming a recording layer thereon, heating it for crystallization, and forming a second dielectric layer thereon.

However, the initialization of the medium one track at a time using the laser beam of small beam spot diameter as used in the recording takes a long time and is makes the productivity lower. Heating of the overall medium rejects the use of inexpensive resin substrates. That is, resin substrates can be distorted upon heating for initialization, causing errors in tracking. Under the circumstances, the use of a so-called bulk erasing is the only technique which is regarded commercially acceptable and currently used. The bulk eraser illuminates a beam from a high-power gas laser or semiconductor laser through a relatively large aperture stop for crystallizing a multiplicity of tracks altogether. Since the bulk eraser permits the recording layer to be locally heated, the substrate temperature is elevated to a little extent, enabling the use of less heat resistant resins as substrates.

Initialization of an optical recording disc with a bulk eraser, however, is a time-consuming process, and it takes several minutes just to initialize one optical recording disc. The process of initialization has been the rate-determining step in the production of the optical recording discs. Speedup of the initialization step is required for improving the production efficiency. The time required for the initialization by a bulk eraser may be reduced by using a high-power laser at a higher disc rotation rate, by increasing the feed rate simultaneously with the increase in the beam spot diameter, or by combining the both. In other words, the initialization step can be speeded up by increasing the area irradiated by the laser beam per unit time while retaining the irradiation power per unit area at the level necessary for the initialization. The laser output, however, can be increased only to a limited level.

In view of such situation, there is a demand for decrease in the laser power per unit area necessary for the initialization. Such decrease in the required laser power per unit area will enable to increase the initialization speed, and in addition, to elongate the life of the laser since the full powered operation of the laser can be avoided with a small sacrifice in the initialization speed.

SUMMARY OF THE INVENTION

In view of the situation as described above, an object of the present invention is to provide a phase change optical recording medium wherein the laser power per unit area necessary for the initialization is reduced, and a method wherein the initialization can be accomplished at a lower laser power.

Such objects are attained by the present invention as described in (1) to (7), below.

(1) An optical recording medium having a phase change recording layer satisfying the relations:

$$A_I \leq 8.0\%,$$

and $$C_I/A_I \geq 3.0$$

when the medium is initialized with a light beam having a wavelength $\lambda_I$, and said recording layer exhibits a reflectivity $A_I$ in amorphous region and a reflectivity $C_I$ in crystalline region at said wavelength $\lambda_I$.

(2) An optical recording medium according to the above (1) satisfying the relation:

$$\lambda_I > \lambda_{RW}$$

when the light beam used in writing and/or reading has a wavelength $\lambda_{RW}$.

(3) An optical recording medium according to the above (2) satisfying the relation:

$$\lambda_I - \lambda_{RW} \geq 100 \text{ nm}$$

(4) An optical recording medium according to the above (1) wherein the medium comprises a substrate, and a first dielectric layer, said recording layer, a second dielectric layer, and a reflective layer disposed on said substrate, and the medium satisfies the relation:

$$65 \text{ nm} < d_1 \leq 143 \text{ nm}$$

when the first dielectric layer has a thickness $d_1$.

(5) An optical recording medium according to the above (4) satisfying the relation:

$$71.5 \text{ nm} \leq d_1 \leq 143 \text{ nm}$$

(6) A method for initializing an optical recording medium having a phase change recording layer wherein the medium is initialized with a light beam having a wavelength $\lambda_I$ satisfying the relations:

$$A_I \leq 8.0\%,$$

and $$C_I/A_I \geq 3.0$$

when said recording layer exhibits a reflectivity $A_I$ in amorphous region and a reflectivity $C_I$ in crystalline region at said wavelength $\lambda_I$.

(7) A method for initializing the optical recording medium according to the above (6) satisfying the relation:

$$\lambda_I > \lambda_{RW}$$

when the light beam used in writing and/or reading has a wavelength $\lambda_{RW}$.

DETAILED DESCRIPTION OF THE INVENTION

Figure 1:
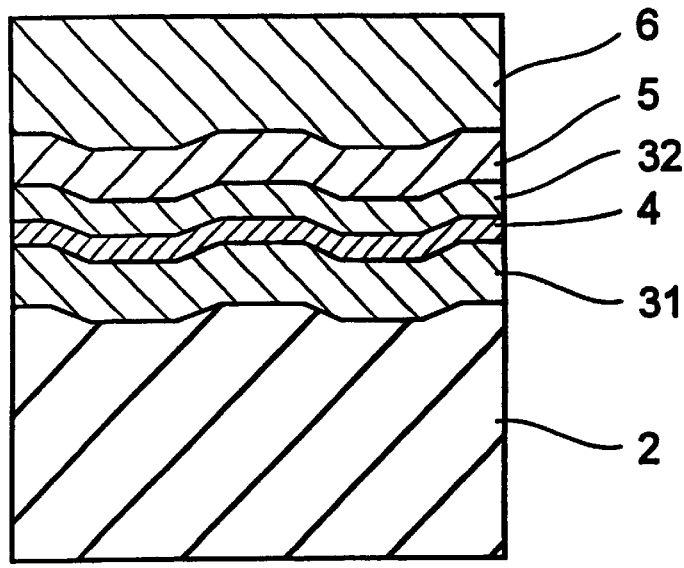
FIG. 1 is a cross sectional view of the optical recording medium according to an embodiment of the present invention.

The optical recording layer of the present invention has a phase change recording layer.

In the optical recording medium of the present invention, when the medium is initialized with the light beam having a wavelength of $\lambda_I$, and the recording layer exhibits a reflectivity $A_I$ in the amorphous region and a reflectivity $C_I$ in the crystalline region at the wavelength $\lambda_I$, $$A_I \leq 8.0\%,$$

and preferably, $$A_I \leq 6.0\%,$$

and $$C_I/A_I \geq 3.0,$$

and preferably, $$C_I/A_I \geq 3.5.$$

First, the reason for the limitation of $A_I$ is described. When $A_I$ is low as defined above, light absorption of the recording layer during the initialization will be increased to enable the decrease in the laser power per unit are necessary for the initialization. Since lower $A_I$ is preferable, the medium is preferably of the optical design wherein $A_I$ is minimized to the least level in the range not adversely affecting the writing and reading properties of the medium. However, $A_I$ is preferably in the range such that:

$$A_I \geq 3.0\%$$

since excessively reduced $A_I$ will result in the difficulty in focus control of the initializing apparatus.

Next, the reason for the limitation of $C_I/A_I$ is described. In the initialization, the medium is scanned with the laser beam having a large beam spot diameter to thoroughly irradiate the entire region of the medium where crystallization is required. For example, in the case of a disc medium, the medium is rotated while the laser beam is directed to the medium such that the laser beam is moved in radial direction in a distance equal to or less than the beam spot diameter of the laser beam per one rotation of the disc. When the feed rate (speed of the movement in radial direction) of the laser beam is designated P, and the beam spot diameter is designated L, P and L are such that L≧P. When L is equal to P, it is mathematically possible to irradiate the entire region of the medium where crystallization is required with the laser beam. The laser beam, however, has an energy distribution, and uniform initialization within the laser spot is quite difficult. In view of such situation, it is commonplace to conduct the initialization with the overlapping beam spots, namely, at L>P. In this case, the region that has once crystallized is again irradiated with the laser beam. When the reflectivity $C_I$ of the crystallized region is too low, the crystallized region will absorb an increased amount of optical energy and the temperature will be increased to result in the change in crystallographic state. Therefore, the region where the beam spot has passed twice will have a reflectivity different from the region where the beam spot has passed once. Since the diameter of the laser beam is markedly larger than the width of the recording track, tracks of different reflectivity will periodically appear on the medium, and the track across which the beam spot has traversed will exhibit varying reflectivity within one track. In contrast, when the $C_I/A_I$ is limited to the range as described above, the amorphous region before the initialization will have a relatively low reflectivity and the crystallized region will have a relatively high reflectivity, and the initialization can be conducted at a low power while avoiding the change in crystallographic state of the crystallized region.

It should be noted that use of a larger $C_I/A_I$ is preferable. However, there is an upper limit for the $C_I/A_I$ because $C_I$ is generally up to 50%, and there is a preferable lower limit for $A_I$ as described above.

In the present invention, $\lambda_I$ and $\lambda_{RW}$ are preferably such that:

$$\lambda_I > \lambda_{RW}$$

since the initialization requires a laser of high power and the laser of high power is generally obtained by the use of a laser with a long wavelength, while use of a laser with short wavelength is preferable for the high-density writing and reading. When $\lambda_I$ and $\lambda_{RW}$ are too close to each other, required high power may not be obtained in the initialization due to the excessively short wavelength of the laser, and the high-density recording may not be enabled due to the excessively long wavelength of the laser in the recording or reading. Therefore, $\lambda_I$ and $\lambda_{RW}$ are preferably such that:

$$\lambda_I - \lambda_{RW} \geq 100 \text{ nm}$$

$\lambda_I$ and $\lambda_{RW}$ are not limited to any particular ranges as long as the $\lambda_I$ is selected such that $A_I$ and $C_I/A_I$ are within the above-described ranges. For the moment, $\lambda_I$ is preferably in the range of about 600 to about 850 nm in industrial point of view of the output and the cost. $\lambda_{RW}$ is preferably up to 700 nm in view of the high density recording. However, when the composition of the recording layer and the structure of the medium are selected to enable writing and reading of sufficient level at a significantly short $\lambda_{RW}$, $\lambda_{RW}$ is preferably at least 380 nm to realize the $A_I$ and the $C_I/A_I$ within the above-described ranges.

An embodiment of the optical recording medium according to the present invention is shown in FIG. 1. This optical recording medium has a first dielectric layer 31, a recording layer 4, a second dielectric layer 32, a reflective layer 5, and a protective layer 6 on a substrate 2 in this order.

In the optical recording medium of such constitution, the thickness $d_I$ of the first dielectric layer 31 is preferably such that:

$$65 \text{ nm} < d_1 \leq 143 \text{ nm},$$

and more preferably, $$71.5 \text{ nm} \leq d_1 \leq 143 \text{ nm}$$

When the first dielectric layer 31 has a thickness $d_I$ within such range, optical design can be more easily accomplished to realize $A_I$ and the $C_I/A_I$ within the above-described ranges using the long wavelength $\lambda_I$ within the range of about 600 to about 850 nm. The reflectivity varies periodically with the alteration in the thickness $d_1$ of the first dielectric layer 31, and therefore, $A_I$ can be reduced even when $d_1$ is greater than 143 nm. In such a case, however, the first dielectric layer 31 will be excessively thick, and the increased internal stress is likely to result in cracks during the storage at a high temperature and a high humidity. On the other hand, an excessively small $d_I$ will result in excessive heat dissipation to the side of the substrate 2 to detract from overwriting properties. It should be noted that $d_1$ is preferably such that: $d_1 < 106$ nm, and more preferably, $$d_1 \leq 102 \text{ nm}$$

since the recording sensitivity reduces with the increase in the reflectivity as the thickness $d_1$ becomes near 143 nm.

In the medium of the constitution shown in FIG. 1, the laser beam in the initialization enters the medium from the same side as the writing and reading.

Constitution of the Medium

Figure 2:
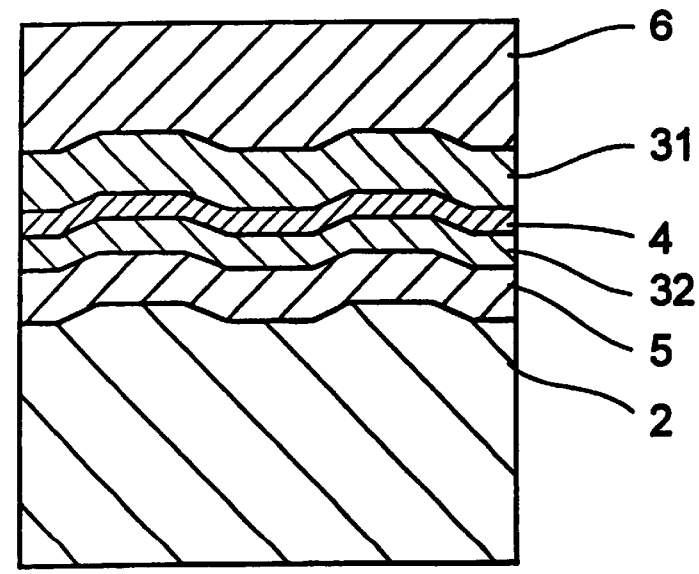
FIG. 2 is a cross sectional view of the optical recording medium according to another embodiment of the present invention.

Next, the component layers of the optical recording medium of the structure as shown FIG. 1 is described. The present invention is not limited to the optical recording medium of the structure as shown in FIG. 1, and may be applied to the optical recording medium of the structure shown in FIG. 2. The optical recording medium of the structure shown in FIG. 2 is a medium of the structure wherein the writing/reading beam is directed to the recording layer without passing the substrate 2. The reflective layer 5, the second dielectric layer 32, the recording layer 4, and the first dielectric layer 31 are disposed in this order on the substrate, and the protective layer 6 is finally disposed on the first dielectric layer 31.

Substrate 2

In the optical recording medium of the constitution as shown in FIG. 1, the laser beam is directed to the recording layer through the substrate 2, and the substrate 2 preferably comprises a material substantially transparent to the laser beam such as a resin and glass. The resin employed is not limited to any particular type, and preferable resins include polycarbonate and amorphous polyolefins. Although the substrate 2 generally has a thickness of about 0.1 to about 3 mm, the merit of the present invention is best exploited when the substrate is thinner, and in particular, when the substrate has a thickness of up to 0.8 mm. As described above, initialization of the medium at a high speed required laser beam of high power, and such initialization with the high power laser beam resulted in the increased warping of the substrate. Such warping increases with the increase in the initialization power. For example, the difference in warping angle before and after the initialization at the substrate thickness of 1.2 mm is 0.01° at the initialization power of 600 mW, and the warping angle difference remains 0.01° even when the initialization power is increased to 900 mW. On the other hand, when the substrate thickness is 0.6 mm, the warping angle difference is at a relatively low level of 0.14° at the initialization power of 600 mW while the difference in warping angle increases to as high as 0.44° when the initialization power is increased to 900 mW. In contrast, the present invention has enabled to reduce the initialization power even when the initialization is conducted at a high speed, and as a consequence, the initialization of the medium having a substrate with a thickness of 0.8 mm or less can be accomplished at a high speed and with the reduced increase in the warping of the substrate.

First Dielectric Layer 31 and Second Dielectric Layer 32

The first dielectric layer 31 plays the role of controlling the optical properties (such as reflectivity) of the overall recording medium, and protecting the substrate by shutting off the heat which can otherwise conduct from the recording layer to the substrate upon recording. The second dielectric layer 32 plays the role of protecting the recording layer and helps the heat remaining in the recording layer after completion of recording release through heat transfer.

The dielectric material used for the first and the second dielectric layer is not limited to any particular type, and various dielectric materials or a mixture thereof as well as various transparent dielectric materials such as silicon oxide, silicon nitride and a mixture of zinc sulfide and silicon oxide and various species of glass may be used. Also useful are so-called LaSiON materials containing La, Si, O, and N, so-called SiAlON materials containing Si, Al, O, and N, SiAlON containing yttrium, etc.

The thickness of the first dielectric layer 31 may be selected to meet the conditions as described above. The thickness of the second dielectric layer 32 is generally selected from the range of about 10 to about 50 nm.

The composition of the dielectric layers 31 and 32 may be either uniform in its thickness direction, or the composition may vary incrementally and/or continuously in the thickness direction.

The dielectric layer is preferably formed by vapor deposition such as sputtering.

Recording Layer 4

The recording layer is not limited for its composition. The recording layer of In—Ag—Te—Sb-based composition or Ge—Sb—Te-based composition, and in particular, the In—Ag—Te—Sb-based composition is preferable to make the full used of the present invention.

In the recording layer of In—Ag—Te—Sb-based composition, atomic ratio of the elements constituting the recording layer is preferably such that:

$$0.1 \leq a \leq 0.3,$$

$$0.1 \leq b \leq 0.3,$$

$$0.5 \leq c \leq 0.8,$$

and $$0 \leq d \leq 0.1$$

when the composition is represented by the formula I:

$$\{(In_aAg_bTe_{1-a-b})_{1-c}Sb_c\}_{1-d}M_d \qquad (I)$$

The element M in the formula I is at least one element selected from Ge, Sn, Pb, H, Si, C, V, W, Ta, Zn, Ti, Ce, Tb, and Y.

In the recording layer of Ge—Sb—Te-based composition, atomic ratio of the elements constituting the recording layer is preferably such that:

$$0.08 \leq a \leq 0.25,$$

and $$0.20 \leq b \leq 0.40$$

when the composition is represented by the formula II:

$$Ge_aSb_bTe_{1-a-b} \qquad (II)$$

In general, the recording layer is preferably deposited to a thickness of 10 to 50 nm.

The recording layer is preferably formed by vapor deposition such as sputtering.

Reflective Layer 5

The reflective layer 5 may be formed from any desired material, and typically, the reflective layer 5 is formed from a metal of high reflectivity such as Al, Au, Ag, Pt, or Cu as a simple substance or as an alloy containing at least one of such metals. The reflective layer is preferably formed by vapor deposition such as sputtering and evaporation.

In the optical recording medium of phase change type, light absorption (Ac) of the recording layer in the region other than record marks (in crystalline state) and the light absorption (Aa) of the recording layer in the record marks (in noncrystalline state) are often different, and the Ac<Aa is the condition generally found in such situation. Recording sensitivity and erasability are thus different depending on whether the region overwritten is crystalline or noncrystalline, and consequently, the record marks of different length and width are formed by the overwriting to invite increase in the jitter often resulting in errors. In order to solve such a situation, the light absorption (Ac) and the light absorption (Aa) are preferably adjusted such that the light absorption (Ac) is in the proximity of the light absorption (Aa), and more preferably such that Ac/Aa≧1, and most preferably such that Ac/Aa>1 in consideration of the latent heat by regulating the thickness of the recording layer or the dielectric layers sandwiching the recording layer. In the medium of conventional structure, an adjustment to increase Ac/Aa results in a reduced difference between the reflectivity (Rc) of the medium of the region other than the record marks and the reflectivity (Ra) of the medium in the record marks, and hence, in a reduced C/N. JP-A 124218/96 proposes an optical information recording medium comprising a substrate, a first dielectric layer, a recording layer, a second dielectric layer, a reflective layer, a third dielectric layer, and a UV curing resin layer disposed in this order wherein Ac>Aa, and an extremely thin film of a metal of high light transmission or a layer of silicon or germanium is used for the reflective layer, and a dielectric material having a refractive index of higher than 1.5 is used for the third dielectric layer. Increase in Ac/Aa is achieved without detracting from the high (Rc-Ra) by providing the reflective layer of high light transmission and the third dielectric layer of high refractive index. The present invention is also applicable to such optical recording medium.

Protective Layer 6

The protective layer 6 is provided for improving scratch resistance and corrosion resistance. Preferably the protective layer is formed of an organic material, typically a radiation curable compound or a composition thereof which is cured with radiation such as electron and UV radiation. The protective layer is generally about 0.1 to about 100 μm thick and may be formed by conventional techniques such as spin coating, gravure coating, spray coating, and dipping.

EXAMPLES

Examples of the present invention are given below by way of illustration and not by way of limitation.

A substrate 2 in the form of a disc having a diameter of 120 mm and a thickness of 0.6 mm was prepared by injection molding polycarbonate. Grooves were simultaneously formed in the injection molding of the substrate 2 to a width of 0.3 μm, depth of 25 nm, and pitch of 0.74 μm. On the grooved surface of the substrate 2, there were formed a first dielectric layer 31, a recording layer 4, a second dielectric layer 32, a reflective layer 5, and a protective layer 6 in this order by the procedure as described below to produce an optical recording disk sample of the structure shown in FIG. 1.

The first dielectric layer 31 was formed by sputtering in argon atmosphere using ZnS (85 mol %)—SiO$_2$ (15 mol %) for the target. The first dielectric layer 31 had a refractive index of 2.22 at a wavelength $\lambda_{RW}$ (635 nm). The thickness $d_1$ of the dielectric layer 31 is shown in Table 1.

The recording layer 4 was formed by sputtering in argon atmosphere using In—Ag—Te—Sb alloy for the target. The recording layer 4 had the composition:

$$(In_a Ag_b Te_{1-a-b})_{1-c} Sb_c$$

wherein a=0.12, b=0.16, and c=0.64.

The recording layer 4 was formed to a thickness of 23 nm.

The second dielectric layer 32 was formed by sputtering in argon atmosphere using ZnS (85 mol %)—SiO$_2$ (15 mol %) for the target. The second dielectric layer was formed to a thickness of 25 nm.

The reflective layer 5 was formed by sputtering in argon atmosphere using Al—1.7 mol % Cr for the target. The reflective layer 5 was formed to a thickness of 100 nm.

The protective layer 6 was formed by applying a UV curable resin by spin coating and exposing it to UV for curing. The protective layer as cured had a thickness of 5 μm.

The thus prepared samples were evaluated for their reflectivity $A_I$ by directing the light beam through the substrate 2 and measuring the reflectivity with a spectrophotometer. The samples were also evaluated for their $C_I$ after initializing the samples. It should be noted that $\lambda_I$ was 810 nm. The initialization was conducted by using a bulk eraser at a wavelength of 810 nm, a beam spot diameter of 100 μm, a feed rate of 60 μm, and at a linear velocity of 3 m/s. The power required for the crystallization of the recording layer is shown in Table 1 as the initialization power. After the initialization, the medium was evaluated for the fluctuation of reflectivity. The results are shown in Table 1. The fluctuation of reflectivity was the value calculated by:

[(Rtop−Rbottom)/Rtop]×100[%]

wherein Rtop represents the maximum reflectivity value and Rbottom represents the minimum reflectivity value in one rotation of the recording track. It should be noted that the fluctuation of reflectivity was measured for 10 tracks near the center of the recording region. The values shown in Table 1 are the averages of the 10 measurements.

The samples were stored under the high temperature, high humidity conditions of 80° C. and 80% RH for 50 hours. The samples after storage were evaluated for the cracks in the first dielectric layer 31. The results are shown in Table 1.

The samples were loaded on an optical recording medium evaluator, and the jitter increase was monitored to find out the number of overwritable operations. The results are shown in Table 1. The term "number of overwritable operations" used herein designates the maximum number of overwritable operations before the jitter exceeds 13%. The sample was over written under the conditions as described below.

Overwriting Conditions

Laser beam wavelength ($\lambda_{RW}$): 635 nm

Numerical aperture, NA: 0.6

Write power: the value shown in Table 1 (the value at which the jitter is minimized), Erase power: 6.0 mW, and Linear velocity: 3.5 m/s

TABLE 1

| Sample No. | $d_1$ (nm) | $A_I$ (%) | $C_I$ (%) | $C_I/A_I$ | Fluctuation of reflectivity (%) | Initialization power (mW) | Write power (mW) | Crack | Number of overwritable operations |
|---|---|---|---|---|---|---|---|---|---|
| 1 (Comp.) | 65.0 | 8.0 | 15.0 | 1.9* | 12 | 800 | 12.5 | no | 10 |
| 2 | 75.3 | 4.5 | 16.5 | 3.7 | 10 | 400 | 13.0 | no | >1,000 |
| 3 | 84.1 | 4.0 | 17.0 | 4.3 | 8 | 400 | 13.0 | no | >1,000 |
| 4 | 95.3 | 4.0 | 17.5 | 4.3 | 8 | 400 | 13.5 | no | >1,000 |
| 5 | 106 | 4.5 | 18.5 | 4.1 | 9 | 400 | >14.0 | no | >1,000 |
| 6 (Comp.) | 191 | 16.0* | 41.0 | 2.6* | 14 | 900 | 12.0 | no | >1,000 |
| 7 | 238 | 8.0 | 27.0 | 3.4 | 10 | 800 | 13.0 | yes | >1,000 |

*The value outside the scope of the invention

The results shown in Table 1 reveal that the power in the initialization can be greatly reduced in the samples wherein $A_I$ is within the scope of the present invention. The samples wherein $C_I/A_I$ is within the scope of the present invention exhibited variation in reflectivity of 10% or less, indicating the high stability in the reflectivity. In contrast, the sample having an excessively high $A_I$ required high initialization power and the sample having an excessively low $C_I/A_I$ required high variation of reflectivity.

In the case of Sample No. 7 wherein $d_1$ was greater than 143 nm, cracks occurred in the first dielectric layer when the sample was stored under high temperature, high humidity conditions. Even if the relation $d_1 \leq 143$ nm is satisfied, the sample having $d_1$ near 143 nm required increased power for the recording, indicating the reduced recording sensitivity. There is also demonstrated that $d_1$ of 65 nm resulted in markedly reduced number of overwriting operations.

Figures 3A, 3B:
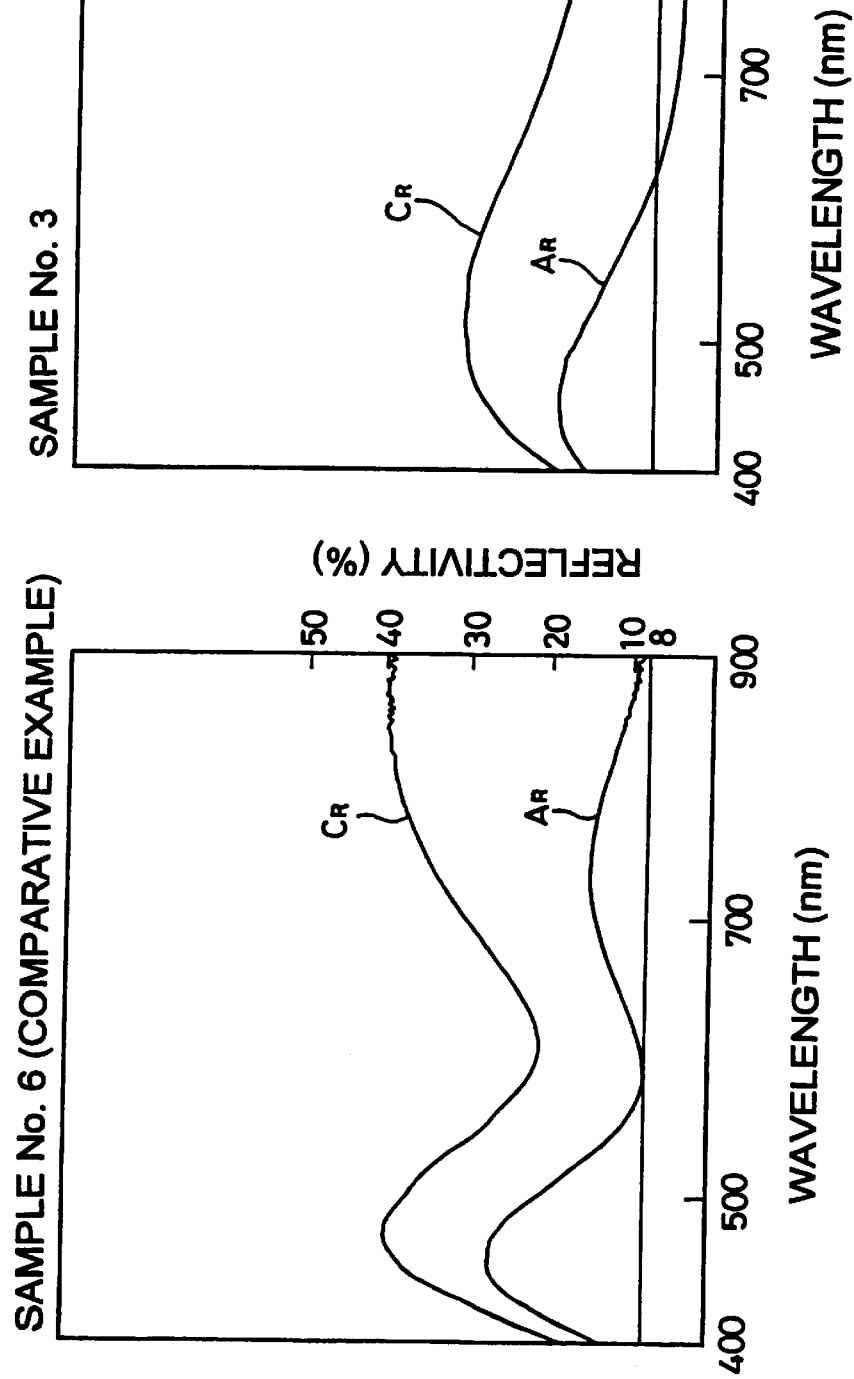
FIGS. 3A and 3B are the graphs showing spectral reflectivity of the optical recording medium of the present invention.

Sample Nos. 3 and 6 shown in Table 1 were evaluated for their reflectivity $A_R$ in the amorphous region and their reflectivity $C_R$ in the crystalline region in the wavelength range of 400 to 900 nm. FIGS. 3A and 3B are graphs showing the spectral reflectivity for Sample No. 6 (Comparative Example) and Sample No. 3, respectively. These graphs indicate that, in the case of Sample No. 3, the relations $A_R \leq 8.0\%$ and $C_R/A_R \geq 3.0$ are satisfied in the wavelength range of from 660 to 840 nm while such relations are never satisfied irrespective of the wavelength in the case of Sample No. 6.

BENEFITS OF THE INVENTION

The present invention has enabled to reduce the power of the laser beam per unit area required in the initialization of the optical recording medium.

Japanese Patent Application Nos. 1999/35818 and 2000/9462 are incorporated herein by reference.

Although some preferred embodiments have been described, many modifications and variations may be made thereto in the light of the above teachings. It is therefore to be understood that, within the scope of the appended claims, the invention may be practiced otherwise than as specifically described.

What is claimed is:

1. A method comprising, in order
   (1) preparing one or more uninitialized optical recording media comprising a phase change recording layer exhibiting a reflectivity $A_I$ in an amorphous region at a wavelength $\lambda_I$;
   (2) selecting media wherein $A_I \leq 8.0\%$;
   (3) initializing the selected media with a light beam having a wavelength $\lambda_I$ to form a crystalline region exhibiting a reflectivity $C_I$ at said wavelength $\lambda_I$; and
   (4) selecting the initialized media wherein $C_I/A_I \geq 3.0$.

2. The method of claim 1, additionally comprising (5) writing and/or reading with a light beam having a wavelength $\lambda_{RW}$ which is less than $\lambda_I$.

3. The method according to claim 2, wherein the optical recording media satisfies the relation:

$$\lambda_I - \lambda_{RW} \geq 100 \text{ nm}.$$

4. The method according to claim 1, wherein the optical recording media comprises a substrate, and a first dielectric layer, said recording layer, a second dielectric layer, and a reflective layer disposed on said substrate, and the media satisfies the relation:

$$65 \text{ nm} < d_1 \leq 143 \text{ nm}$$

when the first dielectric layer has a thickness $d_1$.

5. The method according to claim 4, wherein the media satisfies the relation:

$$71.5 \text{ nm} \leq d_1 \leq 143 \text{ nm}.$$

* * * * *

UNITED STATES PATENT AND TRADEMARK OFFICE
CERTIFICATE OF CORRECTION

PATENT NO. : 6,537,721 B1 Page 1 of 1
DATED : March 25, 2003
INVENTOR(S) : Hiroyasu Inoue et al.

It is certified that error appears in the above-identified patent and that said Letters Patent is hereby corrected as shown below:

Column 12,
Line 7, "$\lambda_r - \lambda_{RW} 24\ 100$ nm." should read -- $\lambda_r - \lambda_{RW} \geq 100$ nm --.

Signed and Sealed this

Second Day of September, 2003

JAMES E. ROGAN
*Director of the United States Patent and Trademark Office*